United States Patent
von Flotow

(10) Patent No.: US 6,594,619 B1
(45) Date of Patent: Jul. 15, 2003

(54) APPARATUS AND METHOD FOR PREDICTING FAILURES OF SPINNING DISKS IN TURBO-MACHINERY

(75) Inventor: Andreas von Flotow, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 233 days.

(21) Appl. No.: 09/624,441

(22) Filed: Jul. 24, 2000

Related U.S. Application Data
(60) Provisional application No. 60/146,672, filed on Aug. 2, 1999.

(51) Int. Cl.[7] .............................................. G06F 15/00
(52) U.S. Cl. ..................... 702/184; 702/250; 702/94; 702/41; 702/33; 416/212 R; 416/212 A; 416/214 R; 416/215; 310/40 R; 310/40.5; 241/50; 241/82.4; 241/107; 74/10.1; 74/20; 74/22 R; 74/318
(58) Field of Search ..................... 702/33–36, 41–43, 702/94, 97, 127, 150, 179, 181–184; 73/1.84, 66, 116, 147, 455, 570; 74/10.1, 20–25, 63–64, 70, 87, 318, 319, 813; 241/24.1, 35, 46.13, 58, 82.4, 107; 324/243; 60/92, 623, 641.4, 246, 332, 324, 354; 123/200, 41.46, 41.49, 41.65, 339.18, 392; 41/592; 310/40 R, 40.5; 416/200 A, 198 A

(56) References Cited

U.S. PATENT DOCUMENTS
4,573,358 A * 3/1986 Luongo ....................... 73/660

OTHER PUBLICATIONS
Bill Walden, True RMS Measuring vs Average Absolute Measuring Current and Voltage Transducers, Oct. 1998, pp. 1–3.*

Key Curriculum Press, The Squre Wave in Detail, Jan. 1996, pp. 1–3.*

* cited by examiner

*Primary Examiner*—Marc S. Hoff
*Assistant Examiner*—Elias Desta
(74) *Attorney, Agent, or Firm*—Bell, Boyd & Lloyd LLC

(57) ABSTRACT

An apparatus is described for detecting the early signs of cycle-induced fatigue and thereby predicting failure of the rotating disk in turbo-machinery. It identifies asymmetrical growth of hub-blade diameter as a predictor of incipient crack growth. Tip measurements are processed through specialized algorithms to detect such asymmetry during operation, providing a real-time, non-destructive method of prediction. The sensors can be housed within the machinery case, and are capable of operating in harsh environments while maintaining adequate stand-off distance, making the entire apparatus robust enough for conditions in high-speed turbo-machinery.

10 Claims, 5 Drawing Sheets

APPARATUS AND METHOD FOR PREDICTING FAILURES OF SPINNING DISKS IN TURBO-MACHINERY

This patent application is directly related to U.S. provisional patent application No. 60/146,672, filed Aug. 2, 1999, the entire contents of which are hereby incorporated by reference and relied upon.

BACKGROUND OF THE INVENTION

1. Field of the Invention

The present invention is for an apparatus and a method for anticipating disk burst failures in turbo-machinery blades. The apparatus comprises at least one blade tip sensor for sensing blade passage making measurements of blade tip time-of-arrival and clearance from the sensor to a blade tip and a computer for compilation and analysis of data from the sensor.

2. Description of the Related Art

If they are not replaced, turbo-machinery disks (spinning hubs and blades) eventually burst due to spin-induced inertial forces and fatigue. The failure pattern varies but is always marked by growth in the diameter of the disk during disintegration. Moreover, such growth is not uniform, but rather biased due to asymmetric crack propagation in the disk.

Historic methods to predict disk failure rely on standard materials analysis, including x-ray crystallography, sonograms, and other diagnostic techniques, after the turbo-machinery is disassembled. The predictive value relies on estimating when micro-cracks have formed and then searching for confirmation. Due to wide variations in operating conditions and in the fatigue life of turbo-machinery components, historic-methods require frequent inspection intervals-to maintain safe operation.

A recent experimental technique employed in spin pit analyses relies on changes in the imbalance when a suspended turbo-disk is spun on a quill shaft. The reasoning behind this technique is that crack propagation will progressively shift the imbalance in the rotating disk. This technique may have applications in controlled experiments in spin pits, but may be-difficult to apply in engine operation, where many effects cause shifts in imbalance.

Disk diameter can be monitored at the blade tips at the outside edge of the disk. For example, in a turbine with N blades, a blade clearance sensing system provides N measures of rotor radius for every engine revolution. The trend of such measurements over many operational cycles can reveal a local bulge or bulges indicative of impending disk burst.

The diameter expands elastically as the disk is spun to high rpm and contracts again when the disk is slowed. Such "elastic stretch" can create a relatively large signal, roughly equal for each blade on the spinning disk. The detection system must discount this form of stretch. One way to do so is to compare disk diameter during each operating cycle at the same rpm, so as to detect only variations due to causes other than elastic stretch.

An additional complication is the variation due to temperature, which can also add significant increases to the diameter. This too can be disregarded by comparing diameter at constant temperature or by comparing each blade to the average of all blades.

It is an object of the present application to present an apparatus and method for anticipating disk burst failures in turbo-machinery which uses one or more case-mounted sensors observing blade passage and interpreting these measurements by searching for unusual deformation of one or a few of the blades.

SUMMARY OF THE INVENTION

The present invention is for an apparatus and a method for anticipating disk burst failures in turbo-machinery blades. The apparatus comprises at least one blade tip sensor for sensing blade passage making measurements of blade tip time-of-arrival and clearance from the sensor to a blade tip and a computer for compilation and analysis of data from the sensor.

In preferred embodiments of the apparatus, the analysis compensates for variation due to inertial and temperature effects by comparing each blade to an average of all blades. It also corrects for once-per-revolution, sinusoidal variation by subtracting a best-fit sinusoidal curve.

In preferred embodiments of the apparatus, the tip clearance sensor is case mounted.

The method for anticipating disk burst failures in turbo-machinery blades, comprises the steps of sensing blade passage and-making measurements of blade tip time-of-arrival and distance from a tip clearance sensor to each blade and analyzing the measurements in a computer.

In preferred embodiments of the method, the analyzing step compensates for variation due to inertial and temperature effects by comparing each blade to an average of all blades. It compensates for once-per-revolution, sinusoidal variation of blade position by subtracting a best-fit sinusoidal curve; and for temperature and inertial effects searching for asymmetric patterns of blade deformation.

In preferred embodiments of the method, the tip clearance sensor is case mounted.

DETAILED DESCRIPTION OF THE INVENTION

Figure 1:
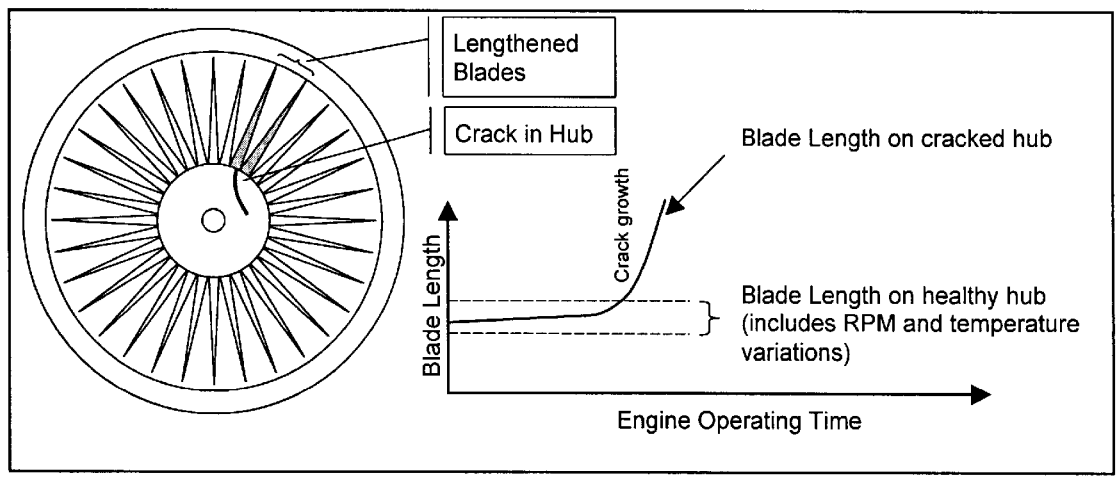
FIG. 1 illustrates the phenomenon on which the present apparatus is based: the asymmetric deformation of a turbo-machinery disk due to crack propagation at the base of a set of blades.

FIG. 1 illustrates the phenomenon on which the present apparatus is based: the asymmetric deformation of a turbo-machinery disk due to crack propagation at the base of a set of blades. Changes in the pattern of blade position are indicative of an impending disk burst.

Components of the apparatus of the present invention include one or more sensors to detect disk diameter, a sensor creating a one-per-revolution signal to track angular orientation of the disk, and a temperature sensor. (The one-per-revolution sensor and the temperature sensor are optional.) A computational algorithm is used to reduce the data in order to search for asymmetric patterns in disk deformation. Blade deformation due to inertia, temperature, and once-per-rev sinusoidal variations are disregarded in order to focus the search for blade deformation due to crack propagation. Results of the sensing and algorithmic system are reported in the form of warning signals, other information for human interpretation, and/or data for both real-time and historic computational analysis.

Although the apparatus can be designed to monitor and to correct for increases due to temperature and rpm, it can also simply compare each blade to the average of all blades. This latter technique focuses the search on unusual patterns of blade deformation compared to an average, while uniform disk deformation due to temperature and inertial factors can be ignored.

Figure 2:
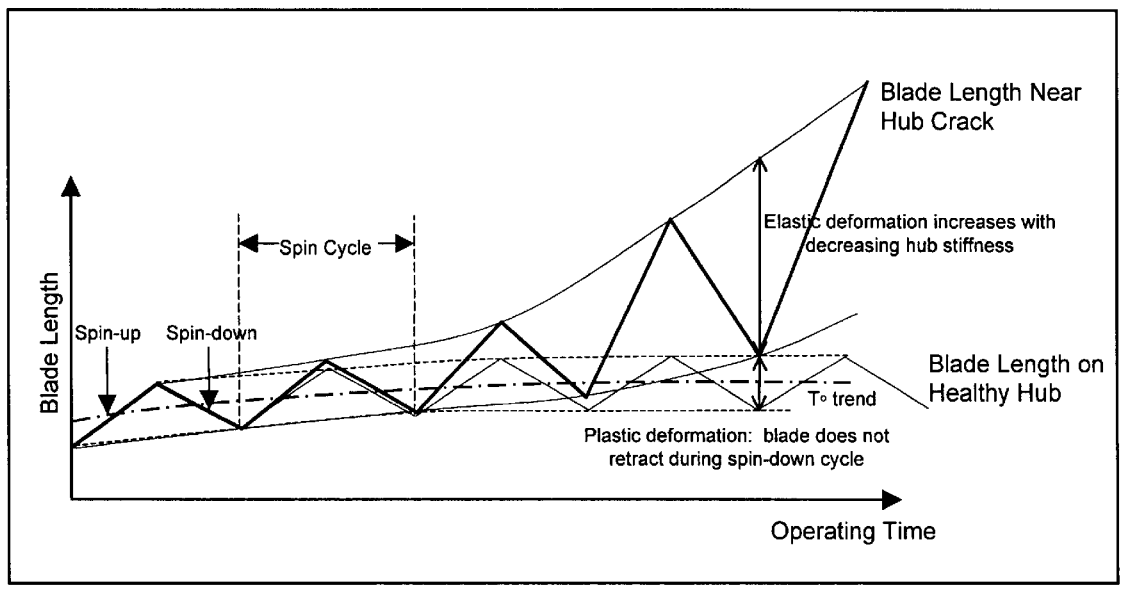
FIG. 2 illustrates changes in blade length as a turbo-disk is cycled in an experimental spin pit to expose it to low-cycle fatigue.

FIG. 2 illustrates changes in blade length as a turbo-disk is cycled in an experimental spin pit to expose it to low-cycle fatigue. Actual operating conditions for turbo-machinery typically differ from those encountered in experimental circumstances. Blade lengths vary with rpm and with temperature. It is possible to correct for these variations. Blade length changes can also be compared to the average length change of all blades in that stage, ignoring temperature and rpm effects. Plastic deformation is identified by an irreversible blade deformation.

Figure 3:
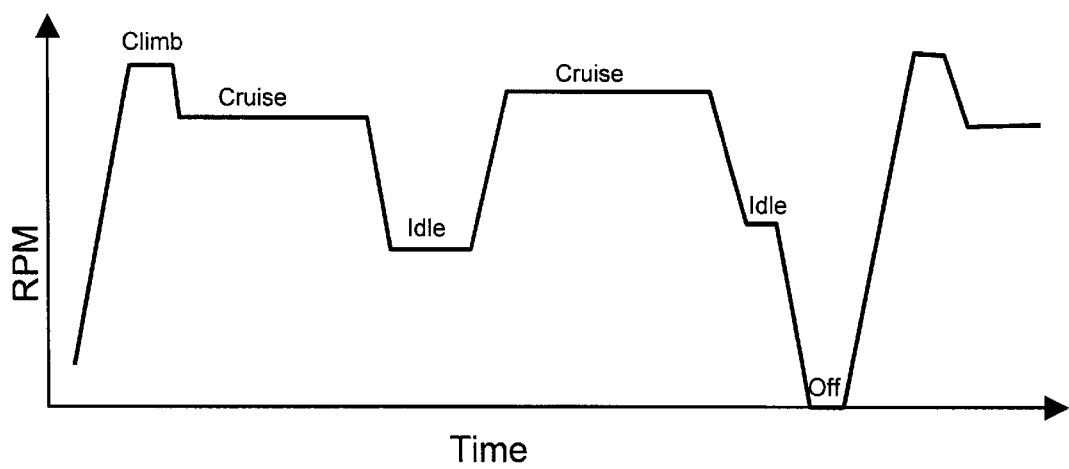
FIG. 3 provides an illustration of the cycles which turbo-machinery experiences in practice: engine speed during flight operations.

FIG. 3 provides an illustration of the cycles which turbo-machinery experiences in practice: engine speed during flight operations. A jet aircraft engine in normal commercial service undergoes relatively few variations in rpm during each flight.

An out-of-round disk pattern may occur for reasons that do not lead to disk burst. Examples include imbalance shift, bearing wear and spool bow. Such factors create once-per-rev sinusoidal variations in the measurements. The algorithm governing this apparatus removes such phenomena from the prediction of burst failure. For each engine revolution, a set of measurements of blade tip clearance is created. The algorithm is designed to develop a "best-fit" one-per-rev sinusoid arid to subtract it from the measurement data. The remaining changes in tip clearance are therefore due to blade deformation, which in turn can indicate incipient disk burst.

Figure 4:
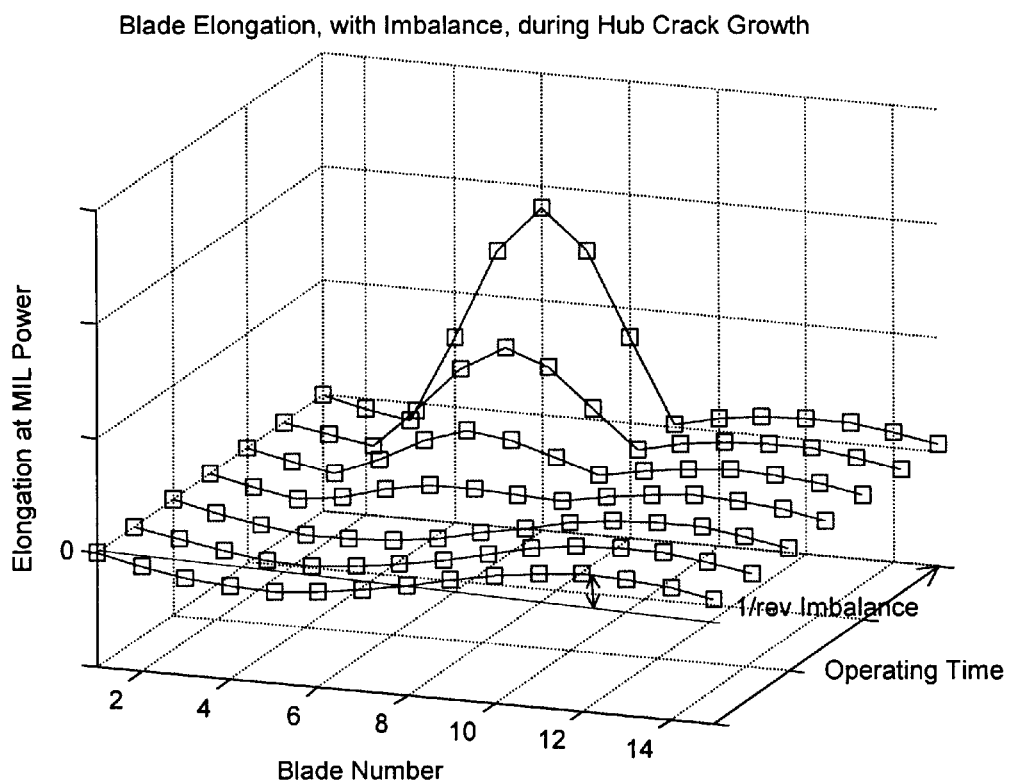
FIG. 4 is a general illustration of sensor response and of data reduction to identify blade elongation.

Instrumentation and its governing algorithm provide a real-time display of the data, in the format illustrated in FIG. 4, i.e., a general illustration of sensor response and of data reduction to identify blade deformation. The graphs illustrate the measurements of blade deformation captured by sensors and the general principles used to reduce measurement data in order to identify asymmetric plastic deformation. Imbalance can be caused by rotor bow and other effects not indicative of disk burst. When such factors are subtracted from the data, the remaining long-term trend of the data then indicates higher-order measures of disk out-of-round. Growth of a neighborhood of blades can indicate incipient disk burst.

Figure 5:
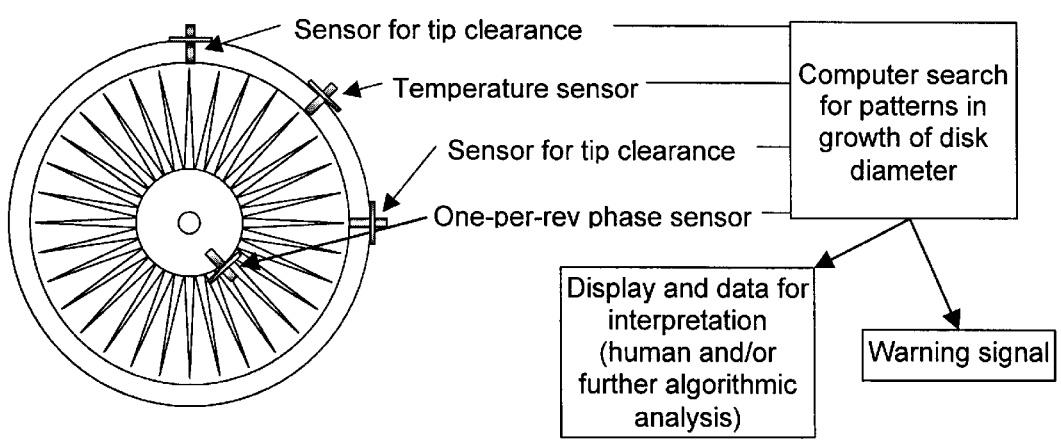
FIG. 5 shows the apparatus of the present invention for predicting disk failure.

FIG. 5 shows the apparatus of the present invention for predicting disk failure. Sensors provide adequate stand-off distance for temperature and inertial growth and for asymmetric deformation due to once-per-rev sinusoidal variations and to crack propagation. The system requires at least one tip clearance sensor, but additional sensors provide redundancy and permit more data analysis. Computational algorithms provide warning signals and displays and data for further interpretation.

The resolution in tip clearance measurement should be about 0.001 inch (0.025 mm), obtained at an adequate "stand-off" distance. Inertial (rpm-induced) elastic growth of the blades may be as large as 0.150 inch (4 mm), and thermal expansion may account for as much as 0.040 inch (1 mm) for large disks. Sensor stand-off distance must thus be about 0.2 inch (5 mm), maybe more if disk run-out is significant. Capacitance sensors are capable of operating with such clearances and at the necessary resolution, though other sensors may also be used.

The sensing and data reduction system can operate with one sensor, or with multiple sensors simultaneously.

The features of the present apparatus to predict disk failure in turbo-machinery are:

(1) A means of tip-sensing blade deformation as a predictor of incipient crack growth leading to disk burst.

The apparatus described above relies on a novel means of detecting crack creation and growth in turbo-machinery. Unlike traditional techniques, it does not require disassembly of the engine, but rather is designed to operate under engine operating conditions while the disk is in motion. Unlike a laboratory technique, it is intended to perform while in turbo-machinery under operating conditions and to provide real-time prediction of disk health or failure. It employs a novel conception of how crack growth contributes to asymmetric growth of the disk and of how to detect and analyze that growth.

(2) An algorithm to reduce measurement data in order to isolate growth in blade deformation due to crack development.

The algorithmic analysis of data relies on a novel combination of straightforward techniques to reduce the sensor measurements to detect crack growth. The algorithms developed for this apparatus adjust for variations in rpm and its inertial effect on disk deformation. They also cancel out temperature effects on blade growth. And finally, they use a "best-fit" once-per-rev sinusoid to account for such effects as imbalance shift, bearing wear and spool bow. Elimination of such inertial, temperature, and sinusoidal effects provides the opportunity to focus on the results of micro-cracks.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus it is to be understood that variations in the present invention can be made without departing from the novel aspects of this invention as defined in the claims. All patents and articles cited herein are hereby incorporated by reference in their entirety and relied upon.

What is claimed is:

1. An apparatus for anticipating disk burst failures in turbo-machinery blades, comprising:

a) at least one blade tip sensor for sensing blade passage making measurements of blade tip time-of-arrival and clearance from the sensor to a blade tip for anticipating disk burst failures; and b) a computer for compilation and analysis of data from the sensor:for anticipating disk burst failures.

2. The apparatus of claim 1, wherein said analysis compensates for variation due to inertial and temperature effects by comparing each blade to an average for all blades.

3. The apparatus of claim 1, wherein said analysis compensates for once-per-revolution, sinusoidal variation of blade-tip position by subtracting a best-fit sinusoidal curve.

4. The apparatus of claim 1, wherein said analysis compensates for temperature and inertial effects by searching for asymmetric patterns of blade deformation.

5. The apparatus of claim 1, wherein said tip clearance sensor is case mounted.

6. A method for anticipating disk burst failures in turbomachinery.blades, comprising the steps of:
   a) sensing blade passage and making measurements of blade tip time-of-arrival and distance from a tip clearance sensor to each blade for anticipating disk burst failures; and
   b) analyzing the measurements in a computer for anticipating disk burst failures.

7. The method of claim 6, wherein said analyzing step compensates for variation due to inertial and temperature effects by comparing each blade to an average for all blades.

8. The method of claim 6, wherein said analyzing step compensates for once-per-revolution, sinusoidal variation of blade-tip position by subtracting a best-fit sinusoidal curve.

9. The method of claim 6, wherein said analyzing step compensates for temperature and inertial effects by searching for asymmetric patterns of blade deformation.

10. The method of claim 6, wherein said tip clearance sensor is case mounted.

\* \* \* \* \*